(12) United States Patent
Takeda

(10) Patent No.: US 8,594,843 B2
(45) Date of Patent: Nov. 26, 2013

(54) ROBOT SIMULATION DEVICE FOR SIMULATING BEHAVIOR OF UMBILICAL MEMBER

(75) Inventor: Toshiya Takeda, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 0 days.

(21) Appl. No.: 13/537,598

(22) Filed: Jun. 29, 2012

(65) Prior Publication Data
US 2013/0035789 A1    Feb. 7, 2013

(30) Foreign Application Priority Data
Aug. 4, 2011    (JP) .................................. 2011-171016

(51) Int. Cl.
*B25J 19/00*    (2006.01)
*B25J 9/22*    (2006.01)

(52) U.S. Cl.
USPC ............................................ 700/245; 901/50

(58) Field of Classification Search
None
See application file for complete search history.

(56) References Cited

U.S. PATENT DOCUMENTS 7,241,969 B2*    7/2007    Inoue et al. ................. 219/125.1
2012/0059629 A1*    3/2012    Hashima et al. ................... 703/1

FOREIGN PATENT DOCUMENTS

JP          10-275007          10/1998

* cited by examiner

*Primary Examiner* — Khoi Tran
*Assistant Examiner* — Ryan Rink
(74) *Attorney, Agent, or Firm* — Drinker Biddle & Reath LLP

(57) ABSTRACT

An umbilical member arrangement unit for an umbilical member, having a function for automatically adjusting each coefficient used in the physical simulation model, corresponding to the actual behavior of the umbilical member. A simulation device has a three-dimensional model generating part configured to generate a three-dimensional model of a umbilical member as a stereo structure constituted by a plurality of mass points and a spring connecting the mass points to each other; a simulating part configured to carry out a physical simulation; a storing part configured to previously store an actual static behavior, an actual dynamic behavior, and an actual dynamic behavior of the umbilical member when colliding with a rigid body; and an automatically adjusting part configured to carry out automatic adjustment so that a result of the physical simulation coincides with the actual behaviors stored in the storing part.

2 Claims, 2 Drawing Sheets

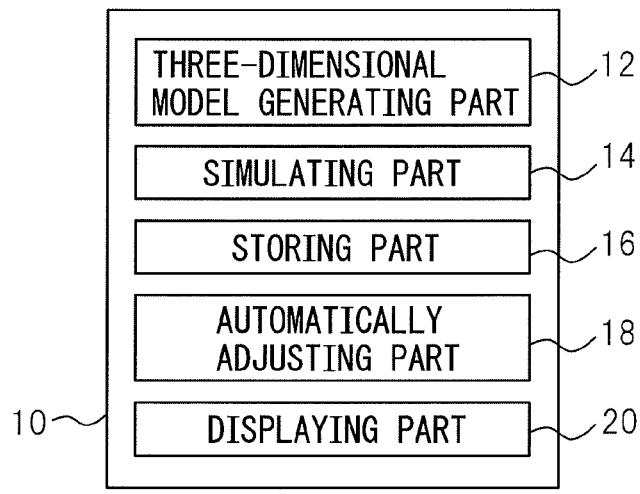
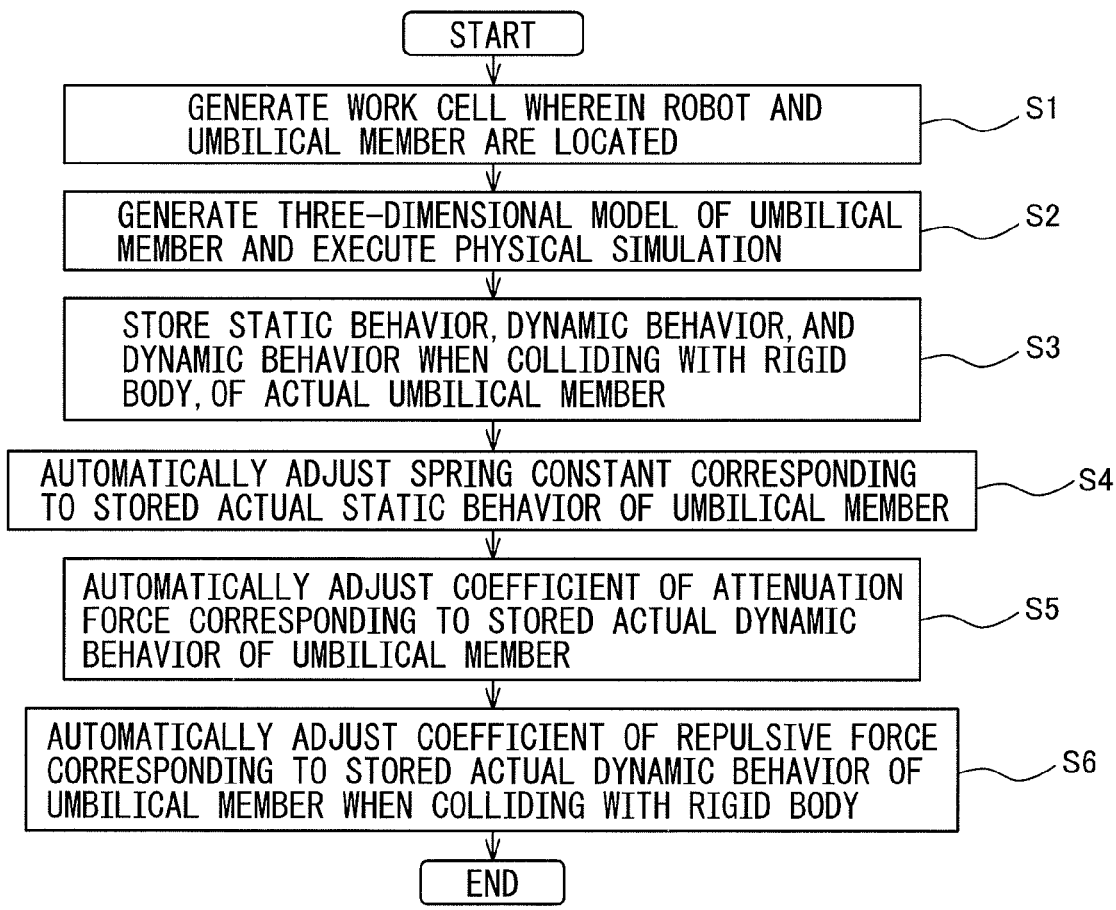

ROBOT SIMULATION DEVICE FOR SIMULATING BEHAVIOR OF UMBILICAL MEMBER

RELATED APPLICATION DATA

This application claims priority under 35 U.S.C. §119 and/or §365 to Japanese Application No. 2011-171016 filed Aug. 4, 2011, the entire contents of which are incorporated herein by reference.

BACKGROUND OF THE INVENTION

1. Field of the Invention

The preset invention relates to a robot simulation device for simulating behavior of an umbilical member such as a hose or a cable arranged on a robot.

2. Description of the Related Art

In a robot simulation device used to teach a robot offline, etc., it is conventional to carry out simulation for replicating the behavior of an umbilical member such as a hose or a cable arranged on a robot mechanical unit.

For example, Japanese Unexamined Patent Publication (Kokai) No. 10-275007 discloses a method for simulating the motion of a robot, wherein it is checked whether a cable or a hose or the like winds around the robot and whether the cable or the hose is excessively elongated or contracted. In this document, it is described that the winding of the entirety of a non-rigid body around the robot is detected in a small amount of calculation wherein a comparison operation relating to a predetermined angle is carried out, and thus the winding of the non-rigid body around the robot can be checked rapidly and correctly.

In the technique of Japanese Unexamined Patent Publication (Kokai) No. 10-275007, the behavior of the non-rigid body when winding around the robot is simply calculated by projecting the non-rigid body on a two-dimensional plane. Therefore, it is difficult to correctly simulate the behavior of the umbilical member, since the umbilical member is actually a three-dimensional article. In other words, in the conventional simulation, when carrying out a physical simulation relating to the behavior of the umbilical member arranged on the robot, it is difficult to adjust each coefficient of a physical simulation model, such as a spring constant and/or an attenuation coefficient, so that the simulated behavior corresponds to the actual behavior of the umbilical member.

SUMMARY OF THE INVENTION

Therefore, an object of the present invention is to provide a robot simulation device having a function for automatically adjusting each coefficient used in the physical simulation model, corresponding to the actual behavior of the umbilical member.

According to the present invention a robot simulation device for simulating a motion of a target section to be simulated, associated with a motion of a robot mechanical unit is provided, wherein the target section corresponds to a portion of an umbilical member arranged on the robot mechanical unit, the portion of the umbilical member being exposed outside the robot mechanical unit, the robot simulation device comprising: a three-dimensional model generating part configured to generate a three-dimensional model of the target section to be simulated, as a stereo structure constituted by a plurality of mass points and a spring connecting the mass points to each other; a simulating part configured to carry out a physical simulation wherein an elastic force of the spring, a gravity force and an attenuation force, which are applied to the mass point, are calculated at specified time intervals, a repulsive force applied to the mass point is calculated at specified time intervals when the mass point interferes with the robot mechanical unit or external equipment, and a position the mass point is changed at specified time intervals based on the elastic force of the spring, the gravity force, the attenuation force and the repulsive force, which are applied to the mass point; a storing part configured to previously store an actual static behavior of the umbilical member, an actual dynamic behavior of the umbilical member, and an actual dynamic behavior of the umbilical member when the umbilical member collides with a rigid body; and an automatically adjusting part configured to automatically adjust a spring constant of the spring so that a result of the physical simulation coincides with the actual static behavior of the umbilical member stored in the storing part, automatically adjust a coefficient of the attenuation force so that a result of the physical simulation coincides with the actual dynamic behavior of the umbilical member stored in the storing part, and automatically adjust a coefficient of the repulsive force so that a result of the physical simulation coincides with the actual dynamic behavior of the umbilical member when the umbilical member collides with the rigid body stored in the storing part.

The robot simulation device may further comprise a displaying part configured to display the motion of the target section to be simulated as a moving image.

BRIEF DESCRIPTION OF THE DRAWINGS

The above and other objects, features and advantages of the present invention will be made more apparent by the following description of the preferred embodiments thereof, with reference to the accompanying drawings, wherein:

FIG. 1 shows a schematic configuration of a robot simulation device according to an embodiment of the invention;

FIG. 2 is a flowchart showing the procedure of the robot simulation device of FIG. 1;

DETAILED DESCRIPTIONS

Figure 3:
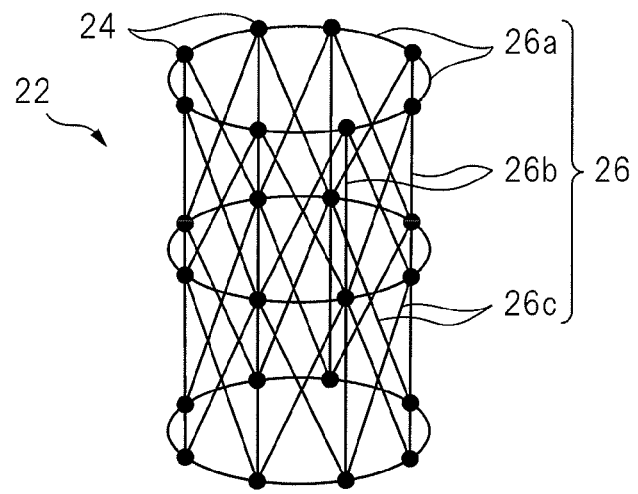
FIG. 3 shows an example of a simulation model of an umbilical member.

FIG. 1 shows a schematic configuration of a robot simulation device (hereinafter, referred to as the simulation device) according to an embodiment of the present invention. In the invention, a portion of an umbilical member arranged on a robot mechanical unit, exposed outside the robot mechanical unit, is determined as a target section to be simulated, and then the motion of the target section, associated with the motion of the robot mechanical unit, is simulated. Concretely, robot simulation device 10 has a three-dimensional model generating part 12 configured to generate a three-dimensional model of the target section to be simulated, as a stereo structure constituted by a plurality of mass points and a spring connecting the mass points to each other (see FIG. 3); a simulating part 14 configured to carry out a physical simulation as explained below; a storing part 16 configured to previously store an actual static behavior of the umbilical member, an actual dynamic behavior of the umbilical member, and an actual dynamic behavior of the umbilical member when the umbilical member collides with a rigid body; and an automatically adjusting part 18 configured to carry out automatic adjustment as explained below so that a result of the physical simulation coincides with the actual behaviors of the umbilical member stored in storing part 16. In addition, simulation device 10 may further have a displaying part 20 configured to display the motion of the umbilical member, or the target section to be simulated, as a moving image.

FIG. 2 is a flowchart showing the procedure of robot simulation device 10, and the details of each step will be explained below.

Step S1

In step S1, a work cell is generated, wherein virtual robot (mechanical unit) and umbilical member are arranged. The work cell may be generated by inputting necessary data into simulation device 10 by an operator, or by loading previously provided various data by using a predetermined robot program, etc. The generated work cell may be displayed on displaying part 20.

Step S2

In step S2, a three-dimensional model of the umbilical member is generated, and a physical simulation of the motion of the umbilical member is carried out. For example, as shown in FIG. 3, simulation (3D) model 22 of the umbilical member is defined as a stereo structure constituted by a plurality of mass points 24 and a spring 26 connecting mass points 24 to each other. Further, spring 26 is constituted by a spring 26a connecting the mass points which are aligned on a common circumference, a spring 26b connecting the mass points in a longitudinal direction of the umbilical member (or a vertical direction in FIG. 3), and a spring 26c connecting the mass points in an oblique direction relative to the longitudinal direction. Spring 26a, which connects the mass points aligned on the common circumference, represents elasticity against a force which is applied to the umbilical member so as to collapse the umbilical member in a radial direction thereof. Spring 26b, which connects the mass points in the longitudinal direction of the umbilical member, represents elasticity against a force in the direction of expansion or contraction of the umbilical member. Further, spring 26c, which connects the mass points in the oblique direction relative to the longitudinal direction, represents elasticity against a force in the direction of deflection or torsion of the umbilical member.

Each mass point 24 has information relating to a mass, a three-dimensional position and a three-dimensional speed thereof. The mass of each mass point is equivalent to a value obtained by dividing the mass of the umbilical member by the number of the mass points. In addition, an initial value of the speed is equivalent to an initial state (0, 0, 0) wherein the umbilical member is in a resting state.

Under the above conditions, a force applied to each mass point can be calculated as below.

(a) Elastic Force of the Spring

It is assumed that mass points "A" and "B" are connected by one spring. In this case, elastic force F1 applied to mass point "A" is represented by following equation (1).

$$F1 = (\text{unit vector from "}A\text{" to "}B\text{"}) \times (\text{spring constant}) \times (\text{amount of expansion/contraction of spring}) \quad (1)$$

In this regard, the amount of expansion or contraction of the spring is obtained by subtracting a natural length of the spring (i.e., a distance between mass points "A" and "B" when the physical simulation model of the umbilical member is in a natural state without expansion, contraction or deflection, etc.) from a length of the spring in a certain condition.

(b) Attenuation Force of Vibration of the Spring

Attenuation force F2 for reducing the vibration of the spring is represented by following equation (2). In this regard, character "v" is a unit vector of ((speed of mass point "B")− (speed of mass point "A")).

$$F2 = v \times (\text{inner product of "}v\text{"}) \times (\text{attenuation coefficient of vibration}) \quad (2)$$

(c) Attenuation Force of Translational Motion

Attenuation force F3 for reducing the translational motion of each mass point is represented by following equation (3).

$$F3 = (\text{speed of each mass point}) \times (\text{attenuation coefficient of translational motion}) \quad (3)$$

In this regard, attenuation force F2 of the spring vibration and attenuation force F3 of the translational motion serve for decelerating the motion of the spring.

(d) Repulsive Force

When the mass point collides with an interference surface, a component value of the speed of the mass point, in relation to the direction perpendicular to the interference surface, is obtained by inverting a sign of the component value before the collision. In this regard, repulsive force F4 is calculated by multiplying the mass of the mass point by the acceleration obtained by dividing the change of the speed between before and after the collision by a unit of time.

(e) Gravity Force

Gravity force F5 applied to each mass point is represented by following equation (4).

$$F5 = (\text{unit vector in the direction of gravity}) \times (\text{gravity acceleration}) \times (\text{mass of mass point}) \quad (4)$$

When forces F1 to F5 applied to each mass point are calculated as explained above, the acceleration is calculated as ((resultant force of F1 to F5)/mass). Then, the amount of change of the speed is calculated as ((acceleration)×(unit of time)), and the amount change of the speed is added to the speed of the mass point. Further, the amount of changed of the position of each mass point is calculated as ((speed)×(unit of time)), and the amount change of the position is added to the position of the mass point.

After the positions of the both ends are changed corresponding to the motion of the robot at every unit of time, the force applied to each mass point is calculated as explained above. Then, the behavior of the umbilical member is simulated by updating the position and the speed of each mass point.

Step S3

In step S3, actual static behavior of the umbilical member, actual dynamic behavior of the umbilical member, and dynamic behavior of the umbilical member when the umbilical member collides with a rigid body, are stored in storing part 16 as explained above. These actual behaviors may be measured in an experiment as explained below. In addition, step S3 may be executed before step S1 or S2.

Figure 4:
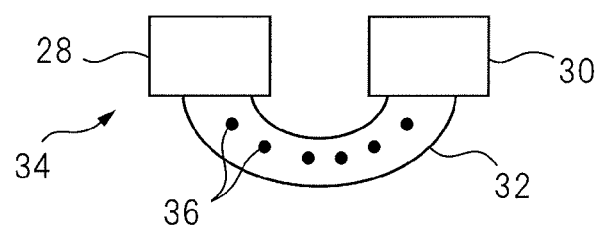
FIG. 4 explains automatic adjustment of a spring constant.

The actual static behavior of the umbilical member may be measured as explained below, for example. As shown in FIG. 4, a testing apparatus 34 is provided, wherein umbilical member 32 is suspended between two rigid bodies 28 and 30, and hangs loosely by the gravity. In this regard, a method for fixing both ends of umbilical member 32 is the same as an actual method for fixing an umbilical member to a robot. In addition, a plurality of marks 36 are added to umbilical member 32 at regular intervals, and the position of each mark is measured when umbilical member 32 is in a resting state. By virtue of this, the static suspending condition of umbilical member 32 can be measured.

Figure 5:
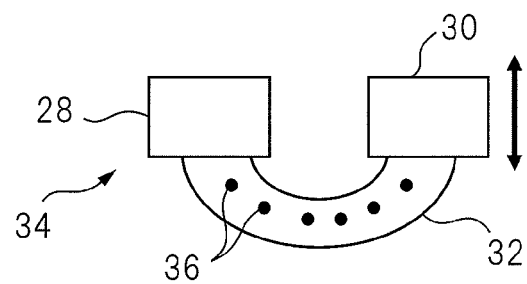
FIG. 5 explains automatic adjustment of a coefficient of an attenuation force.

The actual dynamic behavior of the umbilical member may be measured as explained below, for example. As shown in FIG. 5, in testing device 34 as above, from the static state of umbilical member 32, at least one of the rigid bodies (right rigid body 30 in the illustrated embodiment) is swung. The motion of umbilical member 32 when the rigid body is swung is imaged by a capturing means such as a high-speed camera, and the positions of marks 36 in each obtained image are measured, whereby the actual dynamic behavior can be measured.

Figure 6:
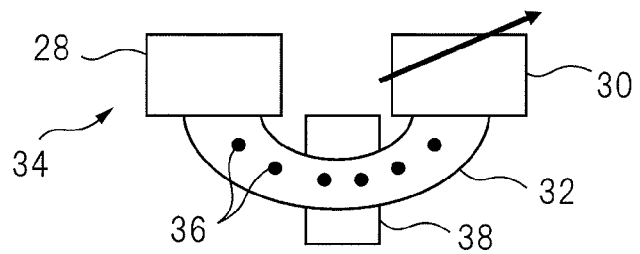
FIG. 6 explains automatic adjustment of a coefficient of a repulsive force.

The actual dynamic behavior of the umbilical member when the umbilical member collides with the rigid body may be measured as explained below, for example. As shown in FIG. 6, in testing device 34 as above, at least one of the rigid bodies (right rigid body 30 in the illustrated embodiment) is swung so that umbilical member 32 collides with another rigid body (or peripheral article) 38. The motion of umbilical member 32 when the umbilical member collides with the rigid body is imaged by a capturing means such as a high-speed camera, and the positions of marks 36 in each obtained image are measured, whereby the actual dynamic behavior when colliding with rigid body 38 can be measured.

Step S4

In step S4, a spring constant is automatically adjusted. In detail, a condition similar to above testing device 34 is replicated as a simulation model, and then a simulation is executed for a period of time sufficient to make the condition static. Then, a distance between each position of marks 36 on umbilical member 32 and the corresponding position in the simulation model is calculated, whereby the static behavior (or a manner of suspension) of the umbilical member is measured. Further, this process is repeated while changing the spring constant so that the spring constant wherein the above distance is minimized (see equation (1)) is automatically calculated. In this regard, when the spring constant near the both ends of the umbilical member is different from the spring constant of the other portion, various behaviors of the umbilical member can be simulated depending on various methods for fixing the umbilical member.

Step S5

In step S5, a coefficient of the attenuation force is automatically adjusted. In detail, similarly to the case wherein the rigid body is swung, on the simulation model, a simulation is executed while changing the positions of the mass points at the end of the umbilical member attached to the swinging rigid body. Then, at time point corresponding to each image, a distance between each position of marks 36 on umbilical member 32 and the corresponding position in the simulation model is calculated. Further, this process is repeated while changing the attenuation coefficient of the vibration of the spring (see equation (2)) and an attenuation coefficient of the translational motion (see equation (3)) so that each attenuation coefficient, by which the above distance is minimized, is automatically calculated.

Step S6

In step S6, a coefficient of the repulsive force (or a repulsive coefficient) is automatically adjusted. In detail, similarly to the case wherein the rigid body is swung, on the simulation model, a simulation is executed while changing the positions of the mass points at the end of the umbilical member attached to the swinging rigid body. Then, at time point corresponding to each image, a distance between each position of marks 36 on umbilical member 32 and the corresponding position in the simulation model is calculated. Further, this process is repeated while changing the repulsive coefficient so that each attenuation coefficient, by which the above distance is minimized, is automatically calculated.

In the above embodiment, the spring constant, the coefficient of the attenuation force and the coefficient of the repulsive force of the three-dimensional model of the umbilical member can be automatically adjusted in a stepwise manner. Therefore, the behavior of the umbilical member in the physical simulation coincides with the actual behavior with high accuracy. By using this simulation, more practical and precise offline teaching can be carried out.

According to the present invention, the spring constant, the coefficient of the attenuation force and the coefficient of the repulsive force of the spring which constitutes the three-dimensional model of the umbilical member is adjusted in a stepwise manner. Therefore, the behavior of the umbilical member in the physical simulation is very similar to the actual behavior of the umbilical member, whereby more practical offline teaching can be carried out.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A robot simulation device for simulating a motion of a target section to be simulated, associated with a motion of a robot mechanical unit, wherein the target section corresponds to a portion of an umbilical member arranged on the robot mechanical unit, the portion of the umbilical member being exposed outside the robot mechanical unit, the robot simulation device comprising:

a three-dimensional model generating part configured to generate a three-dimensional model of the target section to be simulated, as a stereo structure constituted by a plurality of mass points and a spring connecting the mass points to each other;

a simulating part configured to carry out a physical simulation wherein an elastic force of the spring, a gravity force and an attenuation force, which are applied to the mass point, are calculated at specified time intervals, a repulsive force applied to the mass point is calculated at specified time intervals when the mass point interferes with the robot mechanical unit or external equipment, and a position of the mass point is changed at specified time intervals based on the elastic force of the spring, the gravity force, the attenuation force and the repulsive force, which are applied to the mass point;

a storing part configured to previously store an actual static behavior of the umbilical member, an actual dynamic behavior of the umbilical member, and an actual dynamic behavior of the umbilical member when the umbilical member collides with a rigid body; and an automatically adjusting part configured to automatically adjust a spring constant of the spring so that a result of the physical simulation coincides with the actual static behavior of the umbilical member stored in the storing part, automatically adjust a coefficient of the attenuation force so that a result of the physical simulation coincides with the actual dynamic behavior of the umbilical member stored in the storing part, and automatically adjust a coefficient of the repulsive force so that a result of the physical simulation coincides with the actual dynamic behavior of the umbilical member when the umbilical member collides with the rigid body stored in the storing part.

2. The robot simulation device as set forth in claim 1, further comprising a displaying part configured to display the motion of the target section to be simulated as a moving image.

* * * * *